W. V. TURNER.
FLUID PRESSURE BRAKE.
APPLICATION FILED AUG. 22, 1918.
1,309,788.
Patented July 15, 1919.
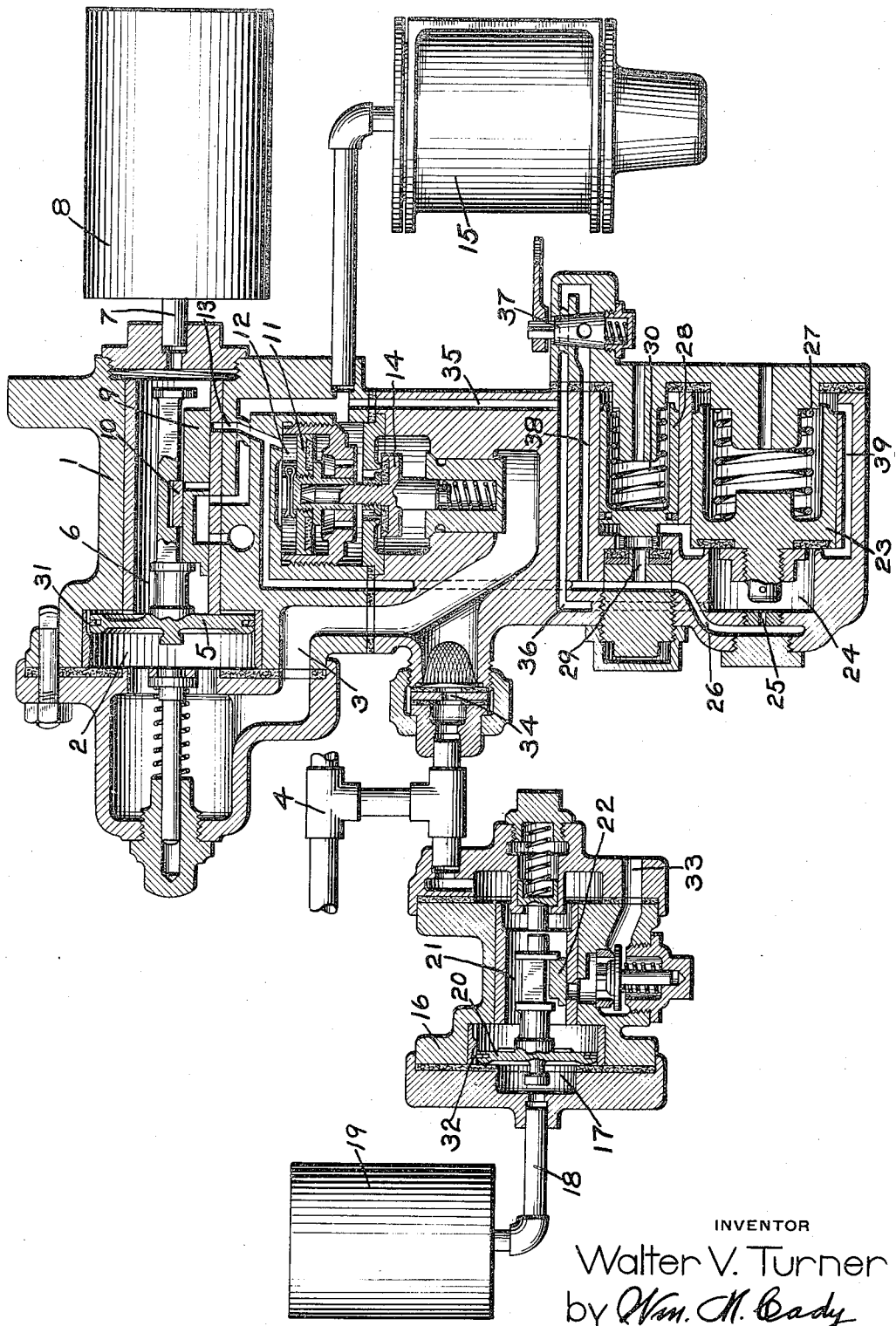
INVENTOR
Walter V. Turner
by Wm. M. Cady
Att'y.

though the feed groove 32, so that piston 20 is shifted outwardly by pressure in the reservoir 19 to cause the vent valve 22 to
UNITED STATES PATENT OFFICE.

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE.

1,309,788.  Specification of Letters Patent.  Patented July 15, 1919.

Application filed August 22, 1918  Serial No. 250,941.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to means for controlling the flow of fluid to the brake cylinder in an emergency application of the brakes.

Where an emergency application of the brakes is made on a long train, since a certain period of time elapses before quick serial action becomes effective at the rear end of the train, the brakes are liable to be applied with force at the head end of the train, while the brakes at the rear end of the train are as yet only lightly applied, and this results in the running in of the slack, so that shocks are produced, which it is desirable to avoid.

In order to obviate the above difficulty, it has heretofore been proposed to provide means for delaying or retarding the building up of pressure in the brake cylinder, so that a more nearly simultaneously application of the brakes throughout the train may be secured.

However, in so-called high speed train service, the retarding of the brake application is not necessary, since the tendency of the slack to run in and cause shocks is reduced at higher train speeds and furthermore, the time required to stop the train would be prolonged unnecessarily.

It happens that usually in high speed service, a high standard brake pipe pressure, say 110 pounds, is employed, while in ordinary train service, a standard normal brake pipe pressure of 70 pounds is used.

The principal object of the present invention is to provide means for automatically cutting out the retarded emergency feature according to the degree of brake pipe pressure employed, so that the above fact that a high standard brake pipe pressure is employed in high speed service is utilized to effect the cutting out of the retarded emergency feature where the train is operated in high speed service.

Other objects and advantages will appear in the following more detailed description of the invention.

In the accompanying drawing, the single figure is a view, mainly in section, of a car air brake equipment, embodying my invention.

According to the drawing, the construction may comprise a triple valve device, the casing 1 of which has a piston chamber 2 connected by passage 3 with brake pipe 4 and containing a piston 5, and a valve chamber 6 connected by pipe 7 to auxiliary reservoir 8 and containing a main slide valve 9 and an auxiliary slide valve 10 adapted to be operated by piston 5.

Within the casing 1 there is also mounted a piston 11 having the chamber 12 at one side connected to a passage 13, leading to the seat of slide valve 9 and adapted to operate a valve 14 for venting fluid from the brake pipe 4 to brake cylinder 15.

A brake pipe vent valve device is connected to the brake pipe 4 and comprises a casing 16, having a piston chamber 17, connected by pipe 18 to a reservoir 19, and containing piston 20, and a valve chamber 21, connected to the brake pipe 4, and containing a valve 22 for controlling the venting of fluid from the brake pipe.

The triple valve casing 1 also contains a valve piston 23 having the chamber 24 at one side connected through a restricted port 25 with a passage 26 and subject on the opposite side to the pressure of a spring 27. A second valve piston 28 is connected at one side through a large port 29 with the passage 26 and is subject on the opposite side to the pressure of a spring 30.

In operation, when the brake pipe is charged with fluid under pressure, fluid flows from piston chamber 2, through the usual feed groove 31 to valve chamber 6 and also to the auxiliary reservoir 8.

Fluid from the brake pipe also flows to valve chamber 21 of the quick action vent valve device and equalizes through feed groove 32 into the reservoir 19.

Upon a sudden reduction in brake pipe pressure to effect an emergency application of the brakes, the brake pipe pressure falls more rapidly than fluid can equalize through the feed groove 32, so that piston 20 is shifted outwardly by pressure in the reservoir 19 to cause the vent valve 22 to open and vent fluid from the brake pipe 4 to the atmospheric exhaust port 33, thus causing a local reduction in brake pipe pressure and quick serial action throughout the train, in the well known manner.

The triple valve piston 5 is also shifted to emergency position by the sudden reduction in brake pipe pressure, so that passage 13 is uncovered by the movement of slide valve 9 and fluid from the auxiliary reservoir 8 is supplied to piston chamber 12.

The piston 11 is thereupon operated to open the valve 14, so that fluid is supplied from the brake pipe 4 through a limiting port 34 to the brake cylinder 15.

With a low standard brake pipe pressure of 70 pounds, for example, the pressure in the brake cylinder due to flow from the brake pipe, only rises to a low degree, say 10 pounds or so, and while brake cylinder pressure acts on the inner seated area of valve piston 23, fluid being supplied to chamber 24 through passages 35 and 36, this low brake cylinder pressure is not sufficient to effect the opening of said valve piston. However, fluid flows from the auxiliary reservoir through passages 13 and 26, and the restricted port 25 to the valve chamber 24, and when the pressure in said chamber has been built up to a predetermined degree, say 30 pounds, by the slow flow of fluid from the auxiliary reservoir to the brake cylinder, through the restricted port 25, the valve piston 23 will open against the resistance of spring 27 and permit the flow of fluid from the chamber 24 to the face of valve piston 28. The valve piston 28 is then operated to open communication from chamber 24 to the large port 29, so that fluid can now flow from the auxiliary reservoir through passage 26 and port 29 to valve chamber 24, and thus through passages 36 and 35 to the brake cylinder 15.

It will now be seen that the building up of pressure in the brake cylinder is retarded in an emergency application of the brakes, where the brake pipe pressure carried in the system is low.

If a high standard brake pipe pressure of say 110 pounds is carried in the brake pipe and an emergency application of the brakes is effected as hereinbefore described, the brake cylinder pressure due to flow from the brake pipe to the brake cylinder will be much greater than where a low brake pipe pressure is carried, and in this case, the pressure in valve chamber 24 is quickly raised, by flow from the brake cylinder through passage 36, to a degree sufficient to open the valve piston 23 and thus permit the rapid flow of fluid from the auxiliary reservoir to the brake cylinder.

As this action occurs very quickly with the high standard brake pipe pressure, it will be seen that the practical effect is to cut out the retarded emergency feature and permit the normal or usual rate of increase in brake cylinder pressure in an emergency application of the brakes.

It may sometimes be desirable to cut out the retarded emergency feature even where a low brake pipe pressure is carried, for example, in short trains, and for this purpose a manually operated cock 37 may be provided. This cock controls communication from a passage 38, leading to passage 26, to passage 36, so that when the cock is turned to its closed position, communication is cut off between passages 36 and 38 and the normal operation of the retarded emergency feature is permitted.

If the cock 37 is turned to its open position, a direct connection is made from the auxiliary reservoir supply passage 26 to the brake cylinder passage 35, so that fluid will be supplied to the brake cylinder at the full emergency rate, independently of the retarded emergency device.

The valve piston 28 is provided for the main purpose of cutting off the flow of fluid from the brake cylinder to the outer exposed area of the valve piston 23, since when the valve piston 23 is in its normal seated position, leakage from the brake cylinder could otherwise occur through the leakage groove 39, which is provided for preventing the building up of pressure on the outer area of said valve piston.

Having now described my invention, what I claim as new and desire to secure by Letters Patent, is:—

1. In a fluid pressure brake, the combination with a brake pipe and a valve device operated upon a sudden reduction in brake pipe pressure for effecting an emergency application of the brakes, of means for retarding the application of the brakes at a low standard brake pipe pressure and operative at a high standard brake pipe pressure to prevent the retardation of the brake application.

2. In a fluid pressure brake, the combination with a brake pipe, brake cylinder, and valve device operated upon a sudden reduction in brake pipe pressure for effecting an emergency application of the brakes, of means for normally limiting the rate of flow of fluid to the brake cylinder and operated at a high standard brake pipe pressure for permitting a normal emergency rate of flow to the brake cylinder.

3. In a fluid pressure brake, the combination with a brake pipe, brake cylinder, auxiliary reservoir, and a valve device operated upon a sudden reduction in brake pipe pressure for effecting an emergency application of the brakes, of valve means subject to the flow of fluid from the auxiliary reservoir, through a restricted port, to the brake cylinder for controlling communication through a large port from the auxiliary reservoir to the brake cylinder.

4. In a fluid pressure brake, the combination with a brake pipe, brake cylinder, auxiliary reservoir, and a valve device operated upon a sudden reduction in brake pipe pressure for supplying fluid from the auxiliary reservoir to the brake cylinder, of valve means subject to the flow of fluid from the auxiliary reservoir, through a restricted port, to the brake cylinder for controlling communication through a large port from the auxiliary reservoir to the brake cylinder.

5. In a fluid pressure brake, the combination with a brake pipe, brake cylinder, auxiliary reservoir, means for supplying fluid from the brake pipe to the brake cylinder, and a valve device operated upon a sudden reduction in brake pipe pressure for opening communication through which fluid is supplied from the auxiliary reservoir to the brake cylinder, of a valve piston subject to brake cylinder pressure and to the flow of fluid from the auxiliary reservoir, through a restricted port, to the brake cylinder for controlling a large port, through which fluid is supplied from the auxiliary reservoir to the brake cylinder.

6. In a fluid pressure brake, the combination with a brake pipe, auxiliary reservoir, brake cylinder, and a valve device operated upon a sudden reduction in brake pipe pressure for supplying fluid from the auxiliary reservoir to the brake cylinder, of a valve piston for controlling a large port for supplying fluid to the brake cylinder and a valve piston subject to the flow of fluid through a restricted port to the brake cylinder for effecting the operation of the first mentioned valve piston.

7. In a fluid pressure brake, the combination with a brake pipe, auxiliary reservoir, brake cylinder, and a valve device operated upon a sudden reduction in brake pipe pressure for opening communication through which fluid is supplied from the auxiliary reservoir to the brake cylinder, of a valve piston for controlling a large port for supplying fluid from the auxiliary reservoir to the brake cylinder and subject to the pressure of a chamber open to the brake cylinder, said chamber being supplied through a restricted port with fluid from the auxiliary reservoir.

In testimony whereof I have hereunto set my hand.

WALTER V. TURNER.